(12) United States Patent
Kaneko

(10) Patent No.: US 6,633,997 B1
(45) Date of Patent: Oct. 14, 2003

(54) SYSTEM FOR AUTOMATICALLY RESTORING TROUBLE, METHOD AND STORAGE MEDIUM

(75) Inventor: Hiroyasu Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 560 days.

(21) Appl. No.: 09/597,089

(22) Filed: Jun. 20, 2000

(30) Foreign Application Priority Data

Jun. 22, 1999 (JP) .......................................... 11-175566

(51) Int. Cl.$^7$ ................................................ G06F 11/00
(52) U.S. Cl. ................................ 714/5; 714/38; 714/25; 714/26; 707/202
(58) Field of Search ............................... 714/5, 26, 38, 714/42, 25, 15; 707/202

(56) References Cited

U.S. PATENT DOCUMENTS

| | | | | |
|---|---|---|---|---|
| 5,485,573 A | * | 1/1996 | Tandon | 714/25 |
| 5,673,386 A | * | 9/1997 | Batra | 714/38 |
| 5,931,955 A | * | 8/1999 | Kung | 714/15 |
| 6,065,017 A | * | 5/2000 | Barker | 707/202 |
| 6,263,457 B1 | * | 7/2001 | Anderson et al. | 714/38 |

FOREIGN PATENT DOCUMENTS

| | | | | |
|---|---|---|---|---|
| JP | 06-332756 A | | 12/1994 | |
| JP | 06332756 A | * | 12/1994 | ........... G06F/11/32 |
| JP | 11-73336 A | | 3/1999 | |
| JP | 11073336 A | * | 3/1999 | ........... G06F/11/00 |

\* cited by examiner

Primary Examiner—Robert Beausoliel
Assistant Examiner—Yolanda L. Wilson
(74) Attorney, Agent, or Firm—Sughrue Mion, PLLC

(57) ABSTRACT

There is disclosed a system in which trouble restoration can quickly be performed without any system engineer familiar with a computer system on standby. An error code is associated beforehand with an error level in an error level correspondence table. When an error occurs, AP transfers the error code to an error level judgment section, the error level judgment section searches the error level correspondence table to obtain the error level associated with the error code of the error, and a database restoration processor is started when the error level indicates "DB trouble". The AP receives the error level from the error level judgment section, again executes the AP when the error level indicates the "DB trouble" or "temporary environment trouble", and abnormally ends the AP when "AP trouble" is indicated.

9 Claims, 3 Drawing Sheets

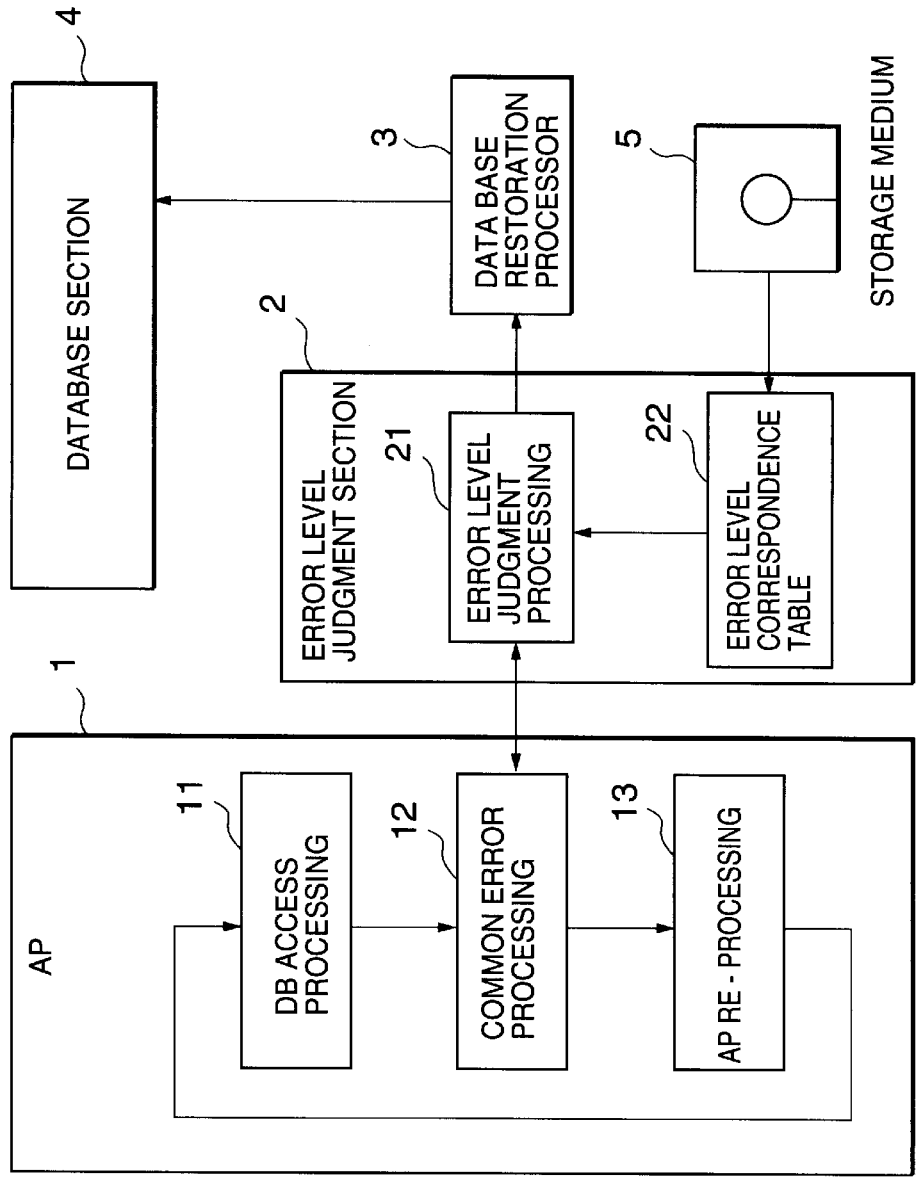

Fig.2

| SQL_CD | ERROR CONTENT | ERROR LEVEL |
|---|---|---|
| 001033 | SHUTDOWN BEING INITIALIZED | DB TROUBLE |
| 001089 | SHUTDOWN BEING PERFORMED | DB TROUBLE |
| 000600 | ORACLE INSIDE EXCEPTION | DB TROUBLE |
| 001034 | ORACLE NOT AVAILABLE | DB TROUBLE |
| 009352 | OS LEVEL ERROR | DB TROUBLE |
| : | : | : |
| 004068 | PACKAGE DISCARD | TEMPORARY ENVIRONMENT TROUBLE |
| 006550 | PL/SQL COMPILE ERROR | TEMPORARY ENVIRONMENT TROUBLE |
| 001555 | RBS OVERFLOW | TEMPORARY ENVIRONMENT TROUBLE |
| 003113 | COMMUNICATION CHANNEL ERROR | TEMPORARY ENVIRONMENT TROUBLE |
| 000060 | DEADLOCK ERROR | TEMPORARY ENVIRONMENT TROUBLE |
| : | : | : |
| 006502 | NUMERICAL VALUE ERROR | AP TROUBLE |
| 001036 | VARIABLE INVALID | AP TROUBLE |
| 001017 | US/PASSWD INVALID | AP TROUBLE |
| 020300 | RETRY NUMBER EXCEEDED | AP TROUBLE |
| 001403 | NOT DATA FOUND | AP TROUBLE |
| : | : | : |

SYSTEM FOR AUTOMATICALLY RESTORING TROUBLE, METHOD AND STORAGE MEDIUM

BACKGROUND OF THE INVENTION

1. Field of the Invention

The present invention relates to a system, a method and a storage medium for automatically restoring a trouble occurring in a computer system.

2. Description of Related Art

In a conventional art, when a trouble occurs in a computer system, a system engineer restores the trouble by performing the following operation.

1) By examining an error code or the log information outputted by an application program (hereinafter referred to as "AP"), a place where the trouble occurs (whether the trouble occurs in a database or the application program) and the cause of the trouble are examined.

2) When the place where the trouble occurs and the cause of the trouble are found, the system engineer determines a restoration operation in accordance with the place and cause and performs the operation.

However, this conventional art has the following problems.

A first problem lies in that the system engineer familiar with the computer system needs to be on standby for the examination of the trouble occurrence place and trouble cause, and the operation cost increases.

A second problem lies in that since the types of errors usually occurring in the computer system amounts to an enormous number, it is difficult to quickly judge a restoration method from the error type even when the system engineer familiar with the computer system is on standby, as a result, a quick trouble restoration cannot be performed, and the system operation ratio lowers.

SUMMARY OF THE INVENTION

The present invention has been developed to solve the above-described conventional problems, and an object thereof is to provide a system which can quickly restore a trouble without any system engineer familiar with a computer system on standby, a method and a storage medium.

According to an aspect of the present invention, there is provided a system for automatically restoring a trouble, comprising: a memory for storing an error level correspondence table in which an error code for univocally distinguishing an error is associated with an error level indicating an error type; and error level judgment means for, when the error occurs in an application program, searching the error level correspondence table to obtain the error level associated with the error code of the error, and performing a trouble restoration processing in accordance with the error level.

According to another aspect of the present invention, there is provided a system for automatically restoring a trouble, comprising: a memory for storing an error level correspondence table in which an error code for univocally distinguishing an error is associated with an error level indicating an error type; error level judgment means for, when the error occurs in an application program utilizing a database, searching the error level correspondence table to obtain the error level associated with the error code of the error; a database restoration processor for restoring the database when the error level obtained by the error level judgment means indicates a database trouble; and common error processing means for again executing the application program when the error level obtained by the error level judgment means indicates the database trouble and the database restoration by the database restoration processor ends.

According to still another aspect of the present invention, there is provided a method for automatically restoring a trouble, comprising the steps of: storing beforehand an error level correspondence table in which an error code for univocally distinguishing an error is associated with an error level indicating an error type; when the error occurs in an application program, searching the error level correspondence table to obtain the error level associated with the error code of the error; and performing a trouble restoration processing in accordance with the obtained error level.

According to still another aspect of the present invention, there is provided a method for automatically restoring a trouble, comprising the steps of: storing beforehand an error level correspondence table in which an error code for univocally distinguishing an error is associated with an error level indicating an error type; when the error occurs in an application program utilizing a database, searching the error level correspondence table to obtain the error level associated with the error code of the error; restoring the database when the obtained error level indicates a database trouble; and again executing the application program when the obtained error level indicates the database trouble and the database restoration ends.

According to still another aspect of the present invention, there is provided a storage medium recording thereon a program enabling a computer to execute: a processing of storing beforehand an error level correspondence table in which an error code for univocally distinguishing an error is associated with an error level indicating an error type; a processing of, when the error occurs in an application program, searching the error level correspondence table to obtain the error level associated with the error code of the error; and a processing of performing a trouble restoration processing in accordance with the obtained error level.

According to still another aspect of the present invention, there is provided a storage medium recording thereon a program enabling a computer to execute: a processing of storing beforehand an error level correspondence table in which an error code for univocally distinguishing an error is associated with an error level indicating an error type; a processing of, when the error occurs in an application program utilizing a database, searching the error level correspondence table to obtain the error level associated with the error code of the error; a processing of restoring the database when the obtained error level indicates a database trouble; and a processing of again executing the application program when the obtained error level indicates the database trouble and the database restoration ends.

BRIEF DESCRIPTION OF THE DRAWINGS

Other features and advantages of the invention will become apparent from the detailed description hereunder, taken in conjunction with the accompanying drawings, wherein:

FIG. 1 is a block diagram showing the constitution of an embodiment according to the present invention;

FIG. 2 is a diagram showing one content example of an error level correspondence table in the embodiment of the present invention.

DETAILED DESCRIPTION OF THE PREFERRED EMBODIMENTS

Figure 3:
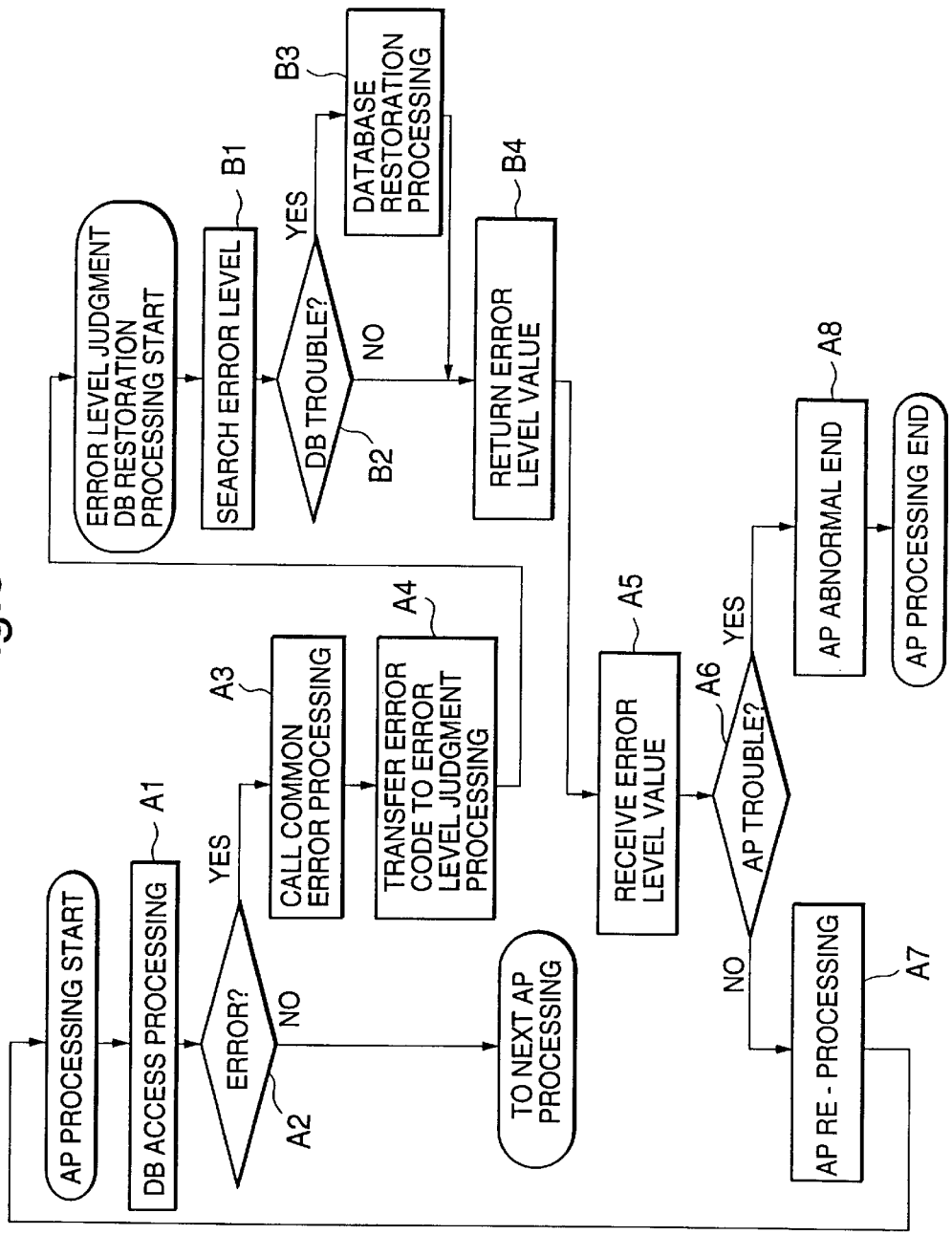
FIG. 3 is a flowchart showing the operation of the embodiment of the present invention.

A first embodiment of the present invention will next be described in detail with reference to the drawings.

Referring to FIG. 1, in the present embodiment, a system utilizing a database (hereinafter referred to also as "DB") is assumed as a computer system, and the system includes an AP 1 for accessing the database while operating, an error level judgment section 2 for determining a restoration method from an error code, a database restoration processor 3 for restoring the database, and a database section 4 comprising the database to be utilized in the system.

The AP 1 includes a DB access processing 11, common error processing 12, and AP re-processing 13.

The DB access processing 11 calls the common error processing 12 when an error occurs during access to DB.

The common error processing 12 calls an error level judgment processing 21 of the error level judgment section 2 to obtain an error level, and calls the AP re-processing 13 when a re-processing is necessary.

The AP re-processing 13 again executes its own processing (AP 1). Additionally, the AP re-processing 13 may be realized by directly incorporating a logic for again executing its processing into the AP 1, or may be realized by restarting the AP 1 by an external program (batch file, and the like) for controlling the execution of the AP 1.

The error level judgment section 2 includes the error level judgment processing 21 and an error level correspondence table 22.

The error level correspondence table 22 stores beforehand a correlation between the error code for univocally distinguishing the error and the error level indicating an error type. In the present embodiment, the error level is classified into three types: a database trouble; a temporary environment trouble; and an AP trouble.

The error level judgment processing 21 uses the error code transferred from the common error processing 12 as a key, searches the error level stored in the error level correspondence table 22, and returns the value to the common error processing 12. Moreover, when the error level indicates the database trouble, the database restoration processor 3 is started.

The database restoration processor 3 automatically restores the database section 4, and specifically realizes automatic restoration by again activating the database section 4.

Moreover, in the present embodiment, a storage medium 5 may be included which records a program (hereinafter referred to as "automatic trouble restoring program") for allowing the computer system to execute the processing in the AP 1, error level judgment section 2 and database restoration processor 3. Here, the storage medium 5 may be a magnetic disk, a semiconductor memory or another storage medium, and the automatic trouble restoring program may be divided into storage medium groups each constituted of a plurality of storage media and recorded. In this constitution, the operation described later in the AP 1, error level judgment section 2 and database restoration processor 3 is performed under the control of the automatic trouble restoring program loaded onto the computer system from the storage medium 5.

FIG. 2 shows one example of the error level correspondence table 22 in the present embodiment.

Referring to FIG. 2, the six-digit numeral in the column under "SQL_CD" indicates the error code, and the corresponding error content can univocally be distinguished. Moreover, all errors are classified into any one of three error levels, that is, "DB trouble", "temporary environment trouble", and "AP trouble". Specifically, the error in which the trouble can be restored by restoring DB and then re-executing AP is classified as the "DB trouble", the error in which the trouble can be restored by re-executing the AP is classified as the "temporary environment trouble", and the error in which the trouble cannot be restored by this method is classified as the "AP trouble". Specifically, the trouble with the same restoration method is classified as the same error level. In the present embodiment, only the above-described three error levels are assumed, but other error levels can also be employed within the scope in which the trouble with the same restoration method is classified as the same error level.

The operation of the present embodiment will next be described in detail with reference to FIGS. 1 to 3.

When the error occurs in the DB access processing 11, the AP 1 calls the common error processing 12 (steps A1, A2, A3 of FIG. 2).

The AP 1 starts the error level judgment section 2 and transfers the error code in the common error processing 12 (step A4).

The error level judgment section 2 uses the error code as the key and searches the error level correspondence table 22 in the error level judgment processing 21 (step B1 of FIG. 2).

Here, when the searched error level indicates the DB trouble (YES in step B2), the database restoration processor 3 is started (step B3). Specifically, for example, when the errors such as "shutdown being initialized", "shutdown being performed", "ORACLE inside exception" shown in FIG. 3 occur, the database restoration processor 3 is started.

Subsequently, after the database restoration by the database restoration processor 3 ends, the error level judgment section 2 returns the error level value to the common error processing 12 (step B4). The common error processing 12 receives the error level value (step A5), re-executes AP when the value is other than the AP trouble, that is, the value indicates the DB trouble or the temporary environment trouble (steps A6, A7), and abnormally ends the AP when the value indicates the AP trouble (steps A6, A8). For example, when the errors such as "shutdown being initialized", "shutdown being performed", "ORACLE inside exception" shown in FIG. 3 occur, and when the errors such as "package discard", "PL/SQL compile error", "RBS overflow" occur, the errors are handled by re-executing the AP, and when the errors such as "numeric value error", "variable invalid", "us/passwd invalid" occur, the errors are handled by abnormally ending the AP.

The operation of the present embodiment ends as described above.

According to the embodiment of the present invention, the error code is associated beforehand with the error level. When the trouble occurs, the automatically restorable place is restored, and the business AP is then automatically executed again. Therefore, much time is not required from the occurrence of the trouble until the restoration of the trouble, which produces an effect that the trouble can quickly be restored even if the system engineer familiar with the computer system is not on standby. Therefore, the system operation ratio is prevented from lowering, and the operation cost is prevented from increasing.

What is claimed is:

1. A system for automatically restoring a trouble, comprising:

a memory for storing an error level correspondence table in which an error code for univocally distinguishing an error is associated with an error level indicating an error type;

error level judgment means for, when the error occurs in an application program utilizing a database, searching said error level correspondence table to obtain the error level associated with the error code of the error;

a database restoration processor for restoring the database when the error level obtained by said error level judgment means indicates a database trouble; and common error processing means for again executing the application program when the error level obtained by said error level judgment means indicates the database trouble and the database restoration by said database restoration processor ends.

2. The system as claimed in claim 1, wherein:

said common error processing means again executes the application program when the error level obtained by said error level judgment means indicates a temporary environment trouble, and abnormally ends the application program when the error level indicates an application program trouble.

3. A method for automatically restoring a trouble, comprising the steps of:

storing beforehand an error level correspondence table in which an error code for univocally distinguishing an error is associated with an error level indicating an error type;

when the error occurs in an application program utilizing a database, searching said error level correspondence table to obtain the error level associated with the error code of the error;

restoring the database when the obtained error level indicates a database trouble; and again executing the application program when said obtained error level indicates the database trouble and the database restoration ends.

4. The method as claimed in claim 3, further comprising the steps of: again executing the application program when said obtained error level indicates a temporary environment trouble, and abnormally ending the application program when the error level indicates an application program trouble.

5. A computer program product having a computer readable medium with computer readable code stored thereon, said computer readable code comprising:

a processing of storing beforehand an error level correspondence table in which an error code for univocally distinguishing an error is associated with an error level indicating an error type;

a processing of, when the error occurs in an application program utilizing a database, searching said error level correspondence table to obtain the error level associated with the error code of the error;

a processing of restoring the data when the obtained error level indicates a database trouble; and a processing of again executing the application program when said obtained error level indicates the database trouble and the database restoration ends.

6. The computer program product as claimed in claim 5, wherein:

said program enables the computer to execute a processing of again executing the application program when said obtained error level indicates a temporary environment trouble, and abnormally ending the application program when the error level indicates an application program trouble.

7. The computer program product as claimed in claim 5, wherein the computer program is obtained by dividing said program into a plurality of parts and storing the plurality of parts into a plurality of storage media.

8. A computer program embodied in a carrier wave, said computer program enabling a computer to execute:

a processing of storing beforehand an error level correspondence table in which an error code for univocally distinguishing an error is associated with an error level indicating an error type;

a processing of, when the error occurs in an application program utilizing a database, searching said error level correspondence table to obtain the error level associated with the error code of the error;

a processing of restoring the database when the obtained error level indicates a database trouble; and a processing of again executing the application program when said obtained error level indicates the database trouble and the database restoration ends.

9. The computer program as claimed in claim 8, wherein:

said program enables the computer to execute a processing of again executing the application program when said obtained error level indicates a temporary environment trouble, and abnormally ending the application program when the error level indicates an application program trouble.

* * * * *